(12) United States Patent
Yoshida et al.

(10) Patent No.: US 10,010,834 B2
(45) Date of Patent: Jul. 3, 2018

(54) OPERATING METHOD FOR MEMBRANE SEPARATION DEVICE AND MEMBRANE SEPARATION DEVICE

(71) Applicant: KUBOTA CORPORATION, Osaka-shi, Osaka (JP)

(72) Inventors: Yasuyuki Yoshida, Amagasaki (JP); Yuji Ohtsuka, Amagasaki (JP)

(73) Assignee: Kubota Corporation, Osaka (JP)

( * ) Notice: Subject to any disclaimer, the term of this patent is extended or adjusted under 35 U.S.C. 154(b) by 556 days.

(21) Appl. No.: 14/496,852

(22) Filed: Sep. 25, 2014

(65) Prior Publication Data

US 2015/0021266 A1    Jan. 22, 2015

Related U.S. Application Data

(63) Continuation of application No. PCT/JP2013/059179, filed on Mar. 28, 2013.

(30) Foreign Application Priority Data

Mar. 28, 2012  (JP) ................................ 2012-072916
Mar. 28, 2012  (JP) ................................ 2012-072917

(51) Int. Cl.
  *B01D 65/02*   (2006.01)
  *B01D 65/08*   (2006.01)
  (Continued)

(52) U.S. Cl.
  CPC ........... *B01D 65/08* (2013.01); *B01D 61/147* (2013.01); *B01D 61/16* (2013.01); *B01D 61/22* (2013.01);
  (Continued)

(58) Field of Classification Search
  None
  See application file for complete search history.

(56) References Cited

U.S. PATENT DOCUMENTS

2007/0039888  A1*  2/2007  Ginzburg ............... B01D 61/18
                                                                210/650

FOREIGN PATENT DOCUMENTS

JP    58-201102    11/1983
JP    8-173965    7/1996
(Continued)

OTHER PUBLICATIONS

Search Report in International Application No. PCT/JP2013/059179 dated May 28, 2013.

*Primary Examiner* — Patrick Orme
(74) *Attorney, Agent, or Firm* — Beyer Law Group LLP

(57) ABSTRACT

A membrane separation device includes a separation membrane immersed in water to be treated and an air diffusion device positioned below the separation membrane, and provides treated water that has permeated through the separation membrane while diffusing air from the air diffusion device towards the separation membrane. A target value setting step sets a target value of an amount of diffusion air diffused from the air diffusion device based on a transmembrane pressure difference, and the air diffusion device is controlled such that the amount of the diffusion air becomes the target value. In the target value setting step, an absolute value of a change or a rate of change in the target value for increasing the amount of the air diffusion is set greater than an absolute value of a change or a rate of change in the target value for decreasing the amount of the air diffusion.

9 Claims, 11 Drawing Sheets

(51) Int. Cl.
*B01D 61/14* (2006.01)
*B01D 61/16* (2006.01)
*B01D 61/22* (2006.01)
*C02F 3/12* (2006.01)
*C02F 1/00* (2006.01)
*C02F 1/44* (2006.01)
C02F 3/00 (2006.01)
C02F 3/30 (2006.01)

(52) U.S. Cl.
CPC .............. *B01D 65/02* (2013.01); *C02F 1/008* (2013.01); *C02F 1/44* (2013.01); *C02F 3/1273* (2013.01); *B01D 2311/14* (2013.01); *B01D 2315/06* (2013.01); *B01D 2321/185* (2013.01); *B01D 2321/40* (2013.01); *C02F 3/006* (2013.01); *C02F 3/301* (2013.01); *C02F 2203/002* (2013.01); *C02F 2209/006* (2013.01); *C02F 2209/03* (2013.01); *C02F 2209/38* (2013.01); *C02F 2209/40* (2013.01); *C02F 2303/16* (2013.01); *C02F 2303/24* (2013.01); *Y02W 10/15* (2015.05)

(56) References Cited

FOREIGN PATENT DOCUMENTS

| | | |
|---|---|---|
| JP | 2005-144291 | 6/2005 |
| JP | 2006-21066 | 1/2006 |
| JP | 2006-75804 | 3/2006 |
| JP | 2009-61398 | 3/2009 |

\* cited by examiner

OPERATING METHOD FOR MEMBRANE SEPARATION DEVICE AND MEMBRANE SEPARATION DEVICE

CLAIM OF PRIORITY

This application is a Continuation of International Patent Application No. PCT/JP2013/059179, filed on Mar. 28, 2013, which claims priority to Japanese Patent Application Nos. 2012-072917 and 2012-072916, both filed on Mar. 28, 2012, each of which is hereby incorporated by reference.

BACKGROUND OF THE INVENTION

1. Field of the Invention

The present invention relates to a membrane separation device and a method for operating the same, where the membrane separation device includes a separation membrane immersed in water to be treated, and an air diffusion device positioned beneath the separation membrane, and provides treated water that has permeated through the separation membrane while diffusing air from the air diffusion device towards the separation membrane.

2. Description of the Related Art

Conventionally, a membrane bioreactor process has been widely used as a method for treating organic wastewater and the like (hereinafter called "water to be treated"), in which organic substances are biodegraded by a purification treatment using microorganisms in activated sludge, and separated water is obtained by solid-liquid separation using a separation membrane. Various methods using a membrane separation device having a separation membrane such as microfiltration membrane, ultrafiltration membrane, or the like have been evaluated as such solid-liquid separation of water to be treated.

Such a membrane separation device is disposed and immersed in the water to be treated, and provided with an air diffusion device positioned beneath the separation membrane thereof in order to prevent filtration efficiency from decreasing by contents adhere to the separation membrane surface, such as the activated sludge itself in a treatment tank, impurities or the like in the water to be treated flowing into the treatment tank, as well as so called fouling substances such as polymer solute from the microorganisms or the water to be treated, colloids, and fine solid matters, or the like. The air diffusion device diffuses air or the like into the tank so as to cause a vibration effect of the separation membrane and a stirring effect of an upward current of air bubbles and the water to be treated, thereby suppressing deposits of solid contents and the like on the separation membrane surface and removing attached solid contents or the like from the separation membrane surface.

Conventionally, the amount of the diffused air supplied from the air diffusion device is set to exceed the minimum amount required for washing the membrane surface such that the separation membrane surface is not easily clogged even under a condition in which the separation membrane surface can otherwise be easily clogged by the influence of sludge properties or the like, which disadvantageously increases the cost of electrical power for air diffusing.

Considering the fact that approximately half of the operating cost required for treatment facilities employing the membrane bioreactor process is being spent on the air diffusion, it is an important issue to reduce the total amount of air diffusion while preventing the clogging of the separation membrane.

In order to reduce the energy cost for the amount of aeration air, Japanese Unexamined Patent Publication No. 2005-144291 proposes a method for controlling an amount of aeration air, which (i) monitors the transmembrane pressure difference of the membrane separation device, (ii) sets the amount of aeration air when the transmembrane pressure difference is within a normal level range excluding an unsteady state of the transmembrane pressure difference to a predetermined permissible steady-state value, and (iii) controls the amount of aeration air supplied from the air diffusion device to increase in the unsteady state when the transmembrane pressure difference suddenly rises above the predetermined value.

This Patent Publication also describes that the amount of aeration air when the behavior of the transmembrane pressure difference is in a steady-state level is set to an allowable lower limit which is such a lower limit of the amount of aeration air, determined by a preliminary test in advance, that the transmembrane pressure difference drastically increases if the amount of aeration air is reduced below this lower limit, and that whether or not the transmembrane pressure difference increases above the predetermined value is evaluated by a rate of increase in the transmembrane pressure difference (for example, expressed as kPa/day).

However, since the transmembrane pressure difference of the separation membrane tends to increase over time, and properties of the water to be treated flowing into the sludge treatment device change according to the season and time, clogging of the separation membrane also varies accordingly. Thus, operating at the lower limit for an extended period of time is realistically challenging, and rather it may cause premature clogging of the separation membrane.

Furthermore, the evaluation using the rate of increase in the transmembrane pressure difference expressed by kPa/day takes at least one day to determine if the transmembrane pressure difference has increased above the predetermined value, and thus the clogging may worsen during that time period.

Although various experiments other than the method disclosed in Japanese Unexamined Patent Publication No. 2005-144291 have been conducted, it is still very challenging to effectively reduce the electric power cost.

BRIEF DESCRIPTION OF THE INVENTION

In light of the foregoing, an object of the present invention is to provide a membrane separation device operating method and a membrane separation device that can effectively reduce the operation cost of the membrane separation device.

In order to accomplish the object, the membrane separation device operating method according to a first construction of the present invention provides a method for operating a membrane separation device which includes a separation membrane immersed in water to be treated, and an air diffusion device positioned below the separation membrane, and provides treated water that has permeated through the separation membrane while diffusing air from the air diffusion device towards the separation membrane. The method includes (a) a target value setting step for setting a target value of an amount of the diffusion air from the air diffusion device based on a transmembrane pressure difference, and (b) a diffusion air amount control step for controlling the air diffusion device so that the amount of the diffusion air becomes the target value. In the target value setting step, an absolute value of a change or a rate of change in the target value for increasing the amount of the air diffusion is set greater than an absolute value of a change or a rate of change in the target value for decreasing the amount of the air diffusion.

According to the aforementioned construction, the target value setting step increases the target value of the amount of the diffusion air from the membrane separation device when the transmembrane pressure difference is large, and decreases the target value of the amount of the diffusion air from the membrane separation device when the transmembrane pressure difference is small. In this target value setting step, the absolute value of the change or the rate of change in the target value set to increase the amount of the air diffusion is greater than the absolute value of the change or the rage of change in the target value set to decrease the amount of the air diffusion. Then the diffusion air amount control step controls the air diffusion device such that the amount of the diffusion air becomes the target value thereof. It should be noted that the transmembrane pressure difference means a pressure necessary to obtain filtered water, and is also referred to as filtration pressure difference, or TMP (Transmembrane Pressure).

When the transmembrane pressure difference is large, the separation membrane is already in a condition where solid materials and the like are attached to the separation membrane surface. Thus, in order to alleviate such a condition, the amount of the diffusion air is increased by a larger rate of change than that for reducing the amount of the diffusion air, so as to enhance the cleaning effect of the separation membrane with an upward current of air bubbles and the water to be treated whereby the materials on the separation membrane surface can be effectively removed. On the other hand, when the transmembrane pressure difference is low, in order to reduce a risk of clogging of the separation membrane surface if the amount of the diffusion air is reduced, the amount of the diffusion air is reduced by a smaller rate of change than that for increasing the amount of the diffusion air so as to suppress a sudden change of the upward current of the air bubbles and the water to be treated, and to avoid a sudden reduction of the cleaning effect for the separation membrane surface, as well as suppressing new attachments of materials.

According to a membrane separation device operating method according to a second construction of the present invention, in addition to the first construction mentioned above, in the diffusion air amount controlling step, a holding time of the target value to increase the amount of the diffusion air is greater than a holding time for the target value to decrease the amount of the diffusion air, regardless of a transmembrane pressure difference.

When the target value is set to increase the amount of the diffusion air, the same condition is maintained for a time period longer than that maintained when the target value is set to decrease the amount of the diffusion air, regardless of the transmembrane pressure difference, the cleaning effect of the separation membrane surface can be further improved. When the amount of the diffusion air is to be reduced, by shortening the time for maintaining the condition, further reduction of the amount of the diffusion air can be relatively quickly ensured.

According to a membrane separation device operating method according to a third construction of the present invention, in addition to the first and/or second constructions mentioned above, the target value setting step sets a first duration time for a transmembrane pressure difference when the transmembrane pressure difference is smaller than a first threshold for lowering the target value, and a second duration time for the transmembrane pressure difference when the transmembrane pressure difference is greater than a second threshold for increasing the target value, the first duration time being set longer than the second duration time, and the target value is modified when the above-mentioned relationship between the transmembrane pressure difference and one of the first and second thresholds is maintained longer than the corresponding one of the first and second duration time.

When the target value of the amount of the diffusion air is to be increased, a decision for setting the target value is made in a time period shorter than that for decreasing the target value such that deposits or sediments on the separation membrane surface are quickly removed, while when the target value of the amount of the diffusion air is to be decreased, the decision for setting the target value takes relatively longer in order to confirm the probability of the condition. In other words, when the transmembrane pressure difference increases and indicates a possibility of the membrane's clogging, removing the deposits or sediments from the separation membrane surface has a higher priority than confirming the probability of the condition, and when the transmembrane pressure difference decreases and indicates that the clogging of the membrane is dissolving, confirming the probability of the condition has priority over reducing the amount of the diffusion air so as to achieve a better control of the separation membrane.

Furthermore, in accordance with a membrane separation device operation method according to a fourth construction of the present invention provides a method for operating a membrane separation device including a separation membrane immersed in water to be treated and an air diffusion device positioned below the separation membrane, where the membrane separation device provides treated water that has permeated through the separation membrane while diffusing air from the air diffusion device towards the separation membrane. The method includes a reference transmembrane pressure difference setting step for updating, in every predetermined period of time, a reference transmembrane pressure difference for evaluating the measured transmembrane pressure difference, and a target value setting step for setting a target value of an amount of the diffusion air from the air diffusion device based on a differential value between the reference transmembrane pressure difference and the measured transmembrane pressure difference.

When a filtration operation is continued using the separation membrane, clogging accumulates over time, and the transmembrane pressure difference tends to increase substantially linearly, and thus it may be possible to control an amount of the diffusion air based on such a linearly-changing transmembrane pressure difference as a reference. However, in reality, conditions of the membrane, conditions of the flowing water to be treated, and conditions of the activated sludge are continuously changing from time to time, and thus if the amount of the diffusion air is controlled stringently based on such an assumed reference value of the transmembrane pressure difference, the amount of the diffusion air is tend to be set at a higher level than necessary. However, according to the aforementioned construction, since the reference transmembrane pressure difference is updated every predetermined period of time in the reference transmembrane pressure difference setting step, the reference transmembrane pressure difference essentially tracks the transmembrane pressure difference of the separation membrane which changes successively. By controlling the amount of the diffusion air by determining whether the current transmembrane pressure difference is lower or higher than such a reference transmembrane pressure difference, the filtration function is maintained without performing excessive air diffusion.

According to a membrane separation device operating method according to a fifth construction of the present invention, in addition to the fourth construction mentioned above, the target value setting step includes (a) setting a first threshold value and a second threshold value for the differential value between the reference transmembrane pressure difference and the measured transmembrane pressure difference, (b) increasing the target value when the differential value is equal to or higher than the first threshold value, (c) decreasing the target value when the differential value is equal to or lower than the second threshold value which is smaller than the first threshold value, and (d) maintaining the target value when the differential value is between the first threshold value and the second threshold value.

The two threshold values are set for the differential value of the measured transmembrane pressure difference with respect to the reference transmembrane pressure difference, and when the differential value becomes equal to or greater than the first threshold value, the amount of the diffusion air is increased so as to enhance a washing action, while the differential value becomes equal to or smaller than the second threshold value, the amount of the diffusion air is reduced. In addition, if the differential value is within a range between the two threshold values, it is determined that the filtering operation is properly performed and a dead zone is provided in which the current amount of the diffusion air is maintained, thereby avoiding frequent changes in a flow on the membrane surface, providing a stable filtration, and thus maintaining the amount of the diffusion air at a low level.

According to a membrane separation device operating method according to a sixth construction of the present invention, in addition to the fourth and/or fifth constructions mentioned above, the reference transmembrane pressure difference setting step maintains a last-updated reference transmembrane pressure difference as the reference transmembrane pressure difference if a currently-updated reference transmembrane pressure difference is smaller than the last-updated reference transmembrane pressure difference.

After updating the reference transmembrane pressure difference downward, there is a stronger tendency that the differential value between the reference transmembrane pressure difference and the measured transmembrane pressure difference becomes large, which may easily result in an increase of the amount of the diffusion air. However, if the reference transmembrane pressure difference is maintained at the last-updated value thereof, there is a strong tendency that the differential value between the reference transmembrane pressure difference and the measured transmembrane pressure difference is stably maintained at a low level, and the amount of the diffusion air can be eventually controlled on a safer side so as not to cause the clogging of the membrane. By updating the reference transmembrane pressure difference when a currently-updated reference transmembrane pressure difference is successively smaller than the last-updated reference transmembrane pressure difference for a plurality of times, the amount of the diffusion air can be stably reduced.

According to a membrane separation device operating method according to a seventh construction of the present invention, in addition to the fourth construction mentioned above, the reference transmembrane pressure difference setting step updates the reference transmembrane pressure difference after at least 3 hours but no more than 12 hours has passed.

The properties of the water to be treated do not frequently fluctuate, but in most cases, fluctuations occur over a certain time period due to external causes such as changes in temperature or the like. For this reason, frequent updates of the reference transmembrane pressure difference is not realistic, and rather, tends to cause an increase in the amount of the diffusion air. On the other hand, if the reference transmembrane pressure difference is not updated for a long period of time, the clogging condition may worsen, and there is a risk of a situation in which removal cannot easily be performed, even if the amount of the diffusion air is increased. Therefore, if the reference transmembrane pressure difference is updated in a time period between 3 hours and 12 hours, the filtration can be performed smoothly by reducing the amount of the diffusion air without causing the clogging.

A membrane separation device according to a first construction of the present invention includes a separation membrane immersed in water to be treated, and an air diffusion device positioned below the separation membrane, and provides treated water that has permeated through the separation membrane while diffusing air from the air diffusion device towards the separation membrane. The membrane separation device further includes a target value setting section that sets a target value of an amount of the diffusion air from the air diffusion device based on the transmembrane pressure difference, and a diffusion air amount controlling section that controls the air diffusion device so that the amount of the diffusion air becomes the target value. The target value setting section sets an absolute value of a change or a rate of change in the target value for increasing the amount of the air diffusion greater than an absolute value of a change or a rate of change in the target value for decreasing the amount of the air diffusion.

A membrane separation device according to a second construction of the present invention includes a separation membrane immersed in water to be treated, and an air diffusion device positioned below the separation membrane. The membrane separation device provides treated water that has permeated through the separation membrane while diffusing air from the air diffusion device towards the separation membrane. The membrane separation device further includes a reference transmembrane pressure difference setting section that updates, in every predetermined period of time, a reference transmembrane pressure difference for evaluating a measured transmembrane pressure difference, and a target value setting section that sets a target value of an amount of the diffusion air from the air diffusion device based on a differential value between the reference transmembrane pressure difference and the measured transmembrane pressure difference.

As described above, the present invention provides a membrane separation device and a method for operating the membrane separation device that are able to effectively reduce the operating cost of the membrane separation.

DETAILED DESCRIPTION OF EMBODIMENTS OF THE INVENTION

Figure 1:
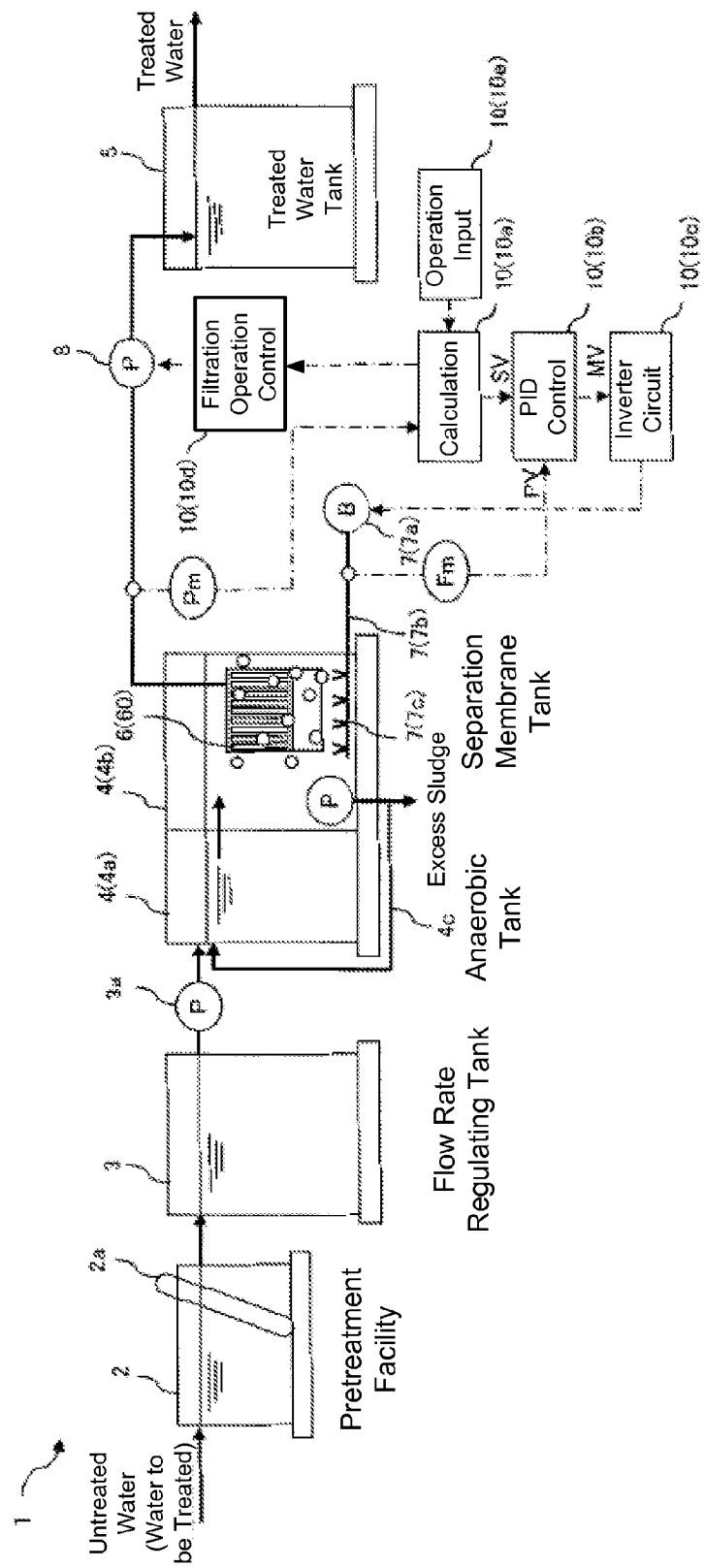
FIG. 1 is a diagram explaining a membrane separation device in accordance with one embodiment of the present invention.

The membrane separation device and the operating method for the membrane separation device according to the present invention are described below. FIG. 1 illustrates an example of a wastewater treatment facility 1 provided with a membrane separation device 6. The wastewater treatment facility 1 includes a pretreatment facility 2, a flow rate regulating tank 3, an activated sludge treatment tank 4 having an anaerobic tank 4a and a separation membrane tank 4b filled with activated sludge, the membrane separation device 6 which is immersed in the separation membrane tank 4b so as to obtain permeated water from the water to be treated within the tank, and a treated water tank 5 which receives treated water filtered by the membrane separation device 6.

The pretreatment facility 2 is provided with a bar screen 2a or the like that removes foreign elements mixed in untreated water. After the foreign elements have been removed therefrom by the bar screen 2a or the like, the water to be treated is temporarily stored in the flow rate regulating tank 3. A flow rate adjusting mechanism 3a including a pump, valve, and the like is provided such that the water to be treated is steadily supplied from the flow rate adjusting tank 3 to the activated sludge treatment tank 4 at a constant flow rate even if the flow rate of the untreated water changes.

A portion of the water to be treated in the separation membrane tank 4b is extracted by a return pump and is returned to the anaerobic tank 4a through a return route 4c. Furthermore, the excess sludge is extracted and discharged.

The membrane separation device 6 includes a plurality of membrane elements 60 and an air diffusion device 7 installed beneath the membrane elements 60. The plurality of membrane elements 60 are accommodated in a casing with a predetermined gap between one another such that the membrane surfaces are vertically positioned.

Figure 2:
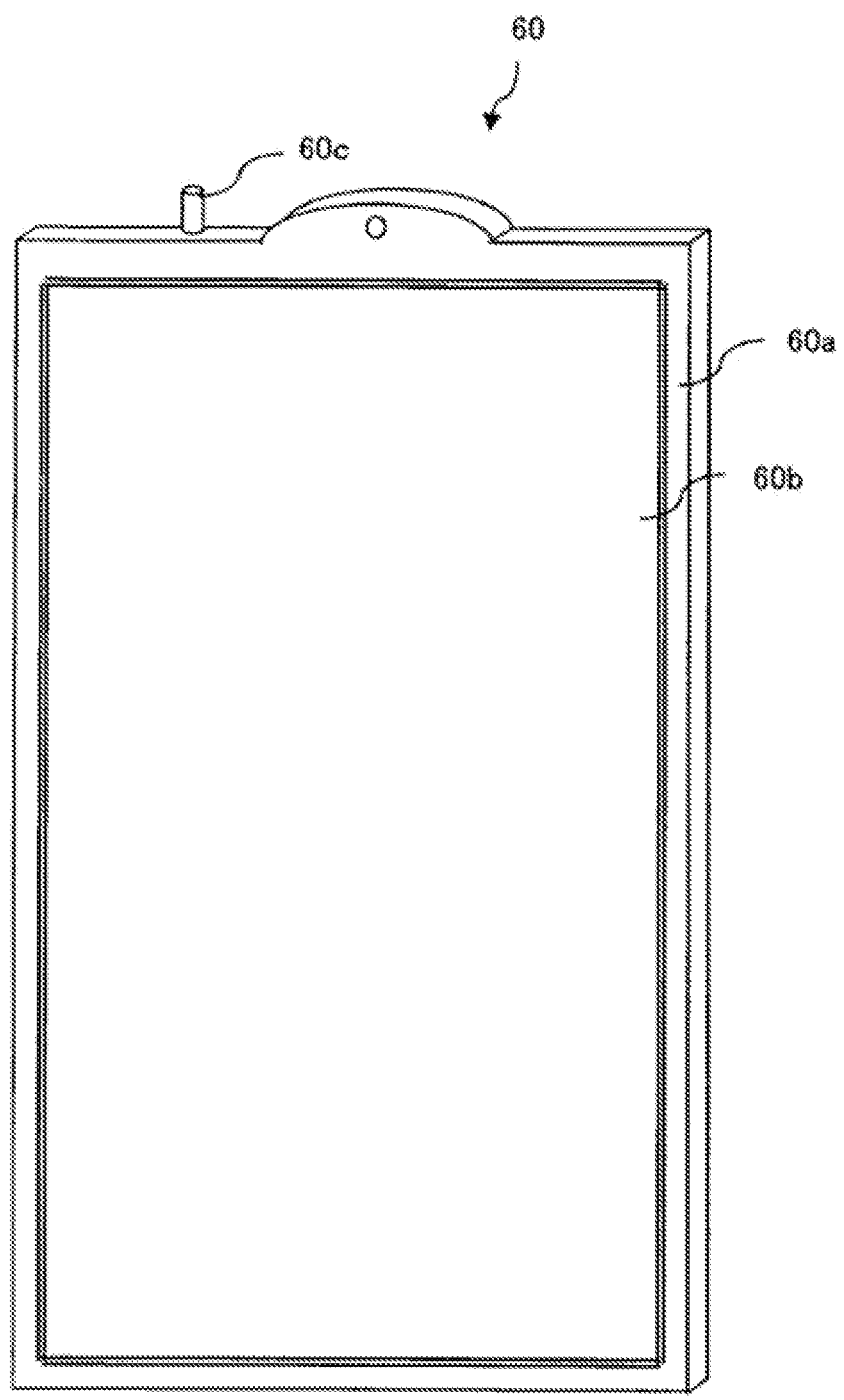
FIG. 2 is a diagram explaining a separation membrane in accordance with one embodiment of the present invention.

As illustrated in FIG. 2, each of the membrane elements 60 has a membrane supporting member 60a made of a resin and provided with a water collecting pipe 60c on an upper part thereof, and a separation membrane 60b which are arranged on both of the front and back surfaces of the membrane supporting member 60a. In the present embodiment, the separation membrane 60b is formed of a microfiltration membrane with a nominal aperture of approximately 0.4 μm, which is formed of a non-woven fabric and a porous resin coated on a surface of the non-woven fabric so as to be impregnate and combined thereto. The treated water permeated through the separation membrane 60b flows along a groove formed in the membrane supporting member 60a to the water collecting pipe 60c.

It should be noted that the type of the separation membrane 60b and the configuration of the membrane elements 60 used in the present invention are not limited to these specific structures, and any type of separation membrane and any configuration of membrane element (such as a hollow fiber membrane element, a tubular membrane element, a monolith membrane element) can also be used.

A filtration pump 8 is connected to a header pipe, and performs suction filtering from each of the membrane elements 60 via the water collecting pipe 60c, such that the water to be treated in the separation membrane tank 4b permeates through the separation membrane 60b due to a pressure difference caused by the filtration pump 8.

The air diffusion device 7 includes an air diffusion pipe 7b having a plurality of aeration holes 7c, and an air supply source formed of a blower 7a that supplies air or the like to the air diffusion pipe 7b. It should be noted that the filtration may be performed using a water head difference between natural water heads of the separation membrane 60b and the treated water tank 5 without using the filtration pump 8.

Returning to FIG. 1, the membrane separation device 6 includes a control device 10 employing a computer which controls operation of the filtration pump 8 via a flow rate adjusting valve (not shown in the figures) or an inverter circuit (not shown in the figures) of the filtration pump 8 such that the amount of the treated water passing through the separation membranes 60b is constant, as well as controlling an amount of the diffusion air from the air diffusion device 7. The control device 10 is formed of blocks such as a calculating unit 10a, a PID control unit 10b, an inverter circuit 10c, a filtration operation control unit 10d, an operation input unit 10e, and the like.

The filtration operation control unit 10d is a block that intermittently drives the filtration pump 8 at a predetermined control cycle based on the control command from the calculating unit 10a. The inverter circuit 10c is a block that adjusts the amount of the diffusion air by changing the number of rotations of a motor of the blower 7a based on a control command from the PID control unit 10b.

The PID control unit 10b is a block that receives an air amount PV from an airflow sensor Fm provided on the air diffusion pipe 7b, performs PID calculation such that the air amount PV becomes a diffusion air amount target value SV input from the calculating unit 10a, and outputs a driving frequency for the motor of the blower 7a, which is a result of the PID calculation, to the inverter circuit 10c.

The operation input unit 10e includes a touch panel for input operation, and is a block to input various control information necessary for the control operation process performed in the calculating unit 10a, for example, a control cycle for the filtration pump 8, a range for setting the diffusion air amount target value SV, an input timing of a stopping pressure and an operation pressure necessary to obtain the transmembrane pressure difference, a threshold value for evaluating the differential value of the transmembrane pressure difference, and the like.

The calculating unit 10a is a block that outputs the control command to the filtration operation control unit 10d so as to intermittently drive the filtration pump 8 with the control cycle which is input via the operation input unit 10e. The calculating unit 10a also receives a pressure from a pressure sensor Pm installed on a pipe on the upstream side of the filtration pump 8, calculates the diffusion air amount target value SV based on that pressure value, and outputs the calculated target value to the PID control unit 10b.

A method for operating the membrane separation device 6 performed by the control device 10 is described below.

Figure 6:
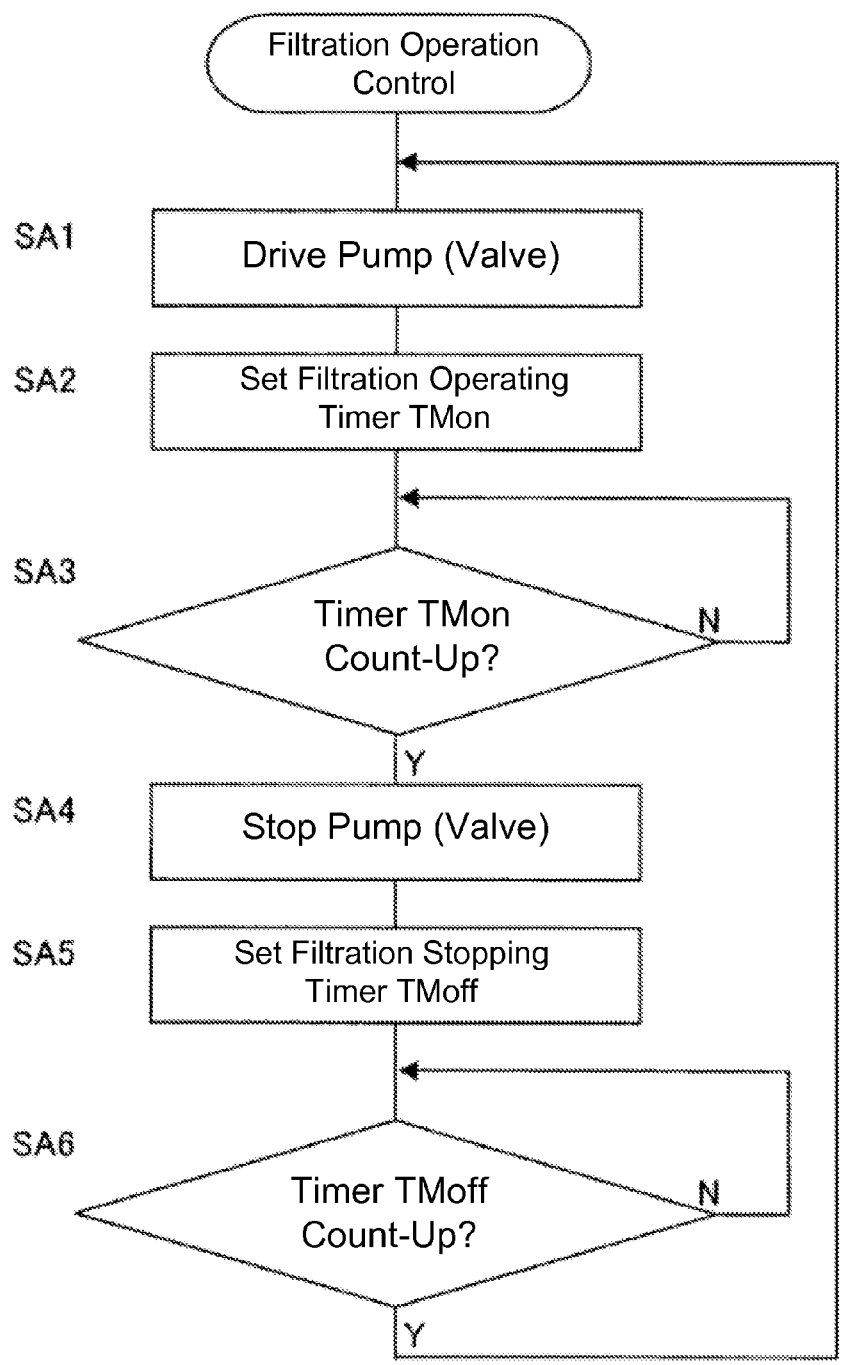
FIG. 6 is a flow chart showing a filtration operation control.

FIG. 6 illustrates a control process performed by the filtration operation control unit 10d. The filtration operation control unit 10d drives the filtration pump 8 (SA1), sets a 9-minute filtration driving timer TMon (SA2), and waits for time of the timer TMon elapses (SA3).

When the timer TMon counts up (SA3, Y), the filtration operation control unit 10d stops the filtration pump 8 (SA4), sets a 1-minute filtration driving timer TMoff (SA5), and waits for time of the timer TMoff elapses (SA6).

When the timer TMoff counts up (SA6, Y), the process returns to step SA1, and then the same operations are repeated. In other words, the filtration operation control unit 10d controls the filtration pump 8 to repeat a 10-minute cycle in which the filtration operation is stopped for 1 minute and performed for 9 minutes. It should be noted that the separation membrane surface is proactively cleaned by continually diffusing air from the air diffusion device even when the filtration pump 8 is stopped.

Figure 3A:
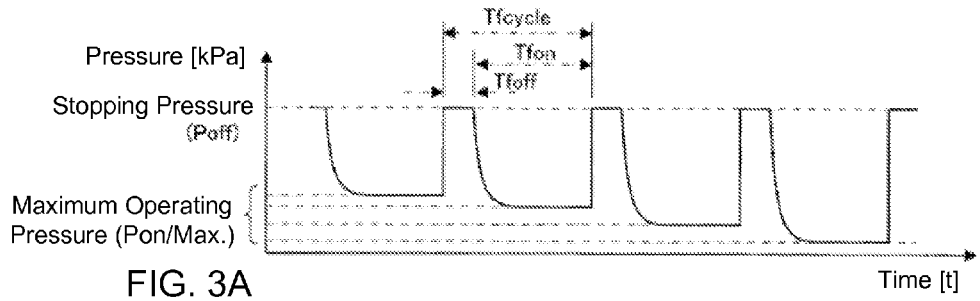
FIGS. 3A, 3B, 3C, and 3D are diagrams explaining an evaluation step for a transmembrane pressure difference.

FIG. 3A illustrates an example of a behavior of the pressure which is detected by the pressure sensor Pm. An operating pressure which is detected when the filtration pump 8 is being driven gradually decreases from a stopping pressure at the beginning of the operation period Tfon (9 minutes in the present embodiment) of the filtration pump 8, to a substantially constant value towards the end of the period. The stopping pressure which is detected when the filtration pump 8 is stopped increases quickly at the beginning of the stopping period Tfoff (1 minute in the present embodiment) of the filtration pump 8, and then is maintained at a substantially constant pressure. Such a behavior is repeated by a cycle Tf (10 minutes in the present embodiment).

A maximum operating pressure Pon/max changes according to surface conditions of the separation membrane 60b, and decreases when the extent of membrane clogging increases, the maximum operating pressure Pon/max. decreases (i.e., increases on the negative side). Therefore, the extent of clogging of the separation membrane 60b can be estimated by monitoring the operating pressure.

The calculating unit 10a calculates, when a value of the pressure sensor Pm is input, a transmembrane pressure difference TMP based on the following equation:

$$TMP = \text{Stopping Pressure}(Poff) - \text{Operating Pressure}(Pon).$$

The calculating unit 10a then calculates a differential value ΔTMP which is a difference between the reference transmembrane pressure difference and the calculated transmembrane pressure difference based on the following equation:

$$\Delta TMP = TMP(\text{cur. value}) - TMP(\text{ref. value}).$$

In the equation above, TMP (cur. value) refers to a current value, and TMP (ref. value) refers to the reference transmembrane pressure difference (it may simply be referred to as a "reference value" below).

Figure 3B:
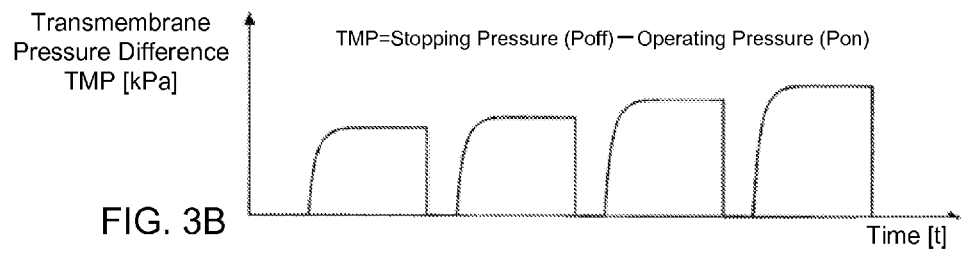
Figure 3C:
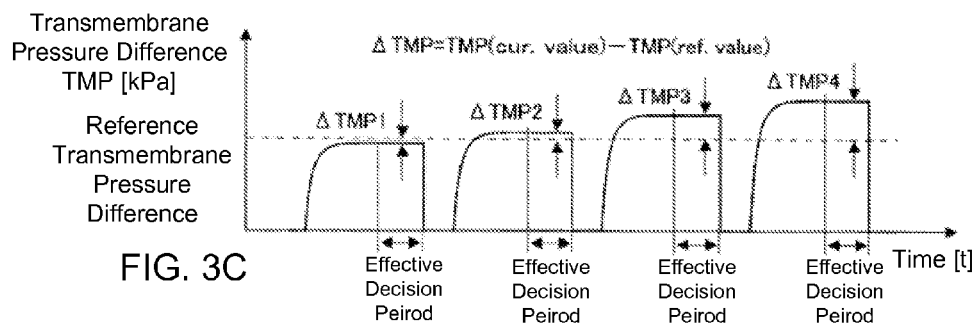

FIG. 3B shows the transmembrane pressure difference corresponding to the pressure shown in FIG. 3A, and FIG. 3C shows the relationship between the current value and the reference value of the transmembrane pressure difference TMP, and the differential value ΔTMP1, ΔTMP2, ΔTMP3, ΔTMP4, . . . of the transmembrane pressure difference.

A value calculated during an effective determination period set as a latter half of an operation period Tfon of the filtration pump 8 in which the transmembrane pressure difference is stabilized to a substantially constant value (see FIG. 3C) is employed as the transmembrane pressure difference to control the amount of the diffusion air. In the present embodiment, a 3-minute period within the 9-minute operation period Tfon after 6 minutes has passed is set as the effective determination period. Although the effective determination period is not limited to this range, it should be set to a time period in which the transmembrane pressure difference is comparatively stable.

Figure 3D:
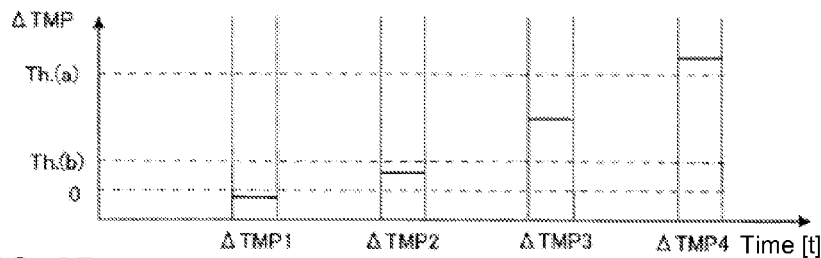

FIG. 3D shows the differential values ΔTMP1, ΔTMP2, ΔTMP3, ΔTMP4, . . . of the transmembrane pressure difference which are calculated during the effective determination period. Although FIG. 3D illustrates the differential values as liner lines showing substantially constant values, in reality, the differential values fluctuate up and down. The differential value is zero if the transmembrane pressure difference is the same as the reference value, negative if it is smaller than the reference value, and positive if it is greater than the reference value.

The calculating unit 10a sets two thresholds Th(a) and Th(b) (Th(b)<Th (a)) for the differential value ΔTMP of the transmembrane pressure difference during the effective determination period. The calculating unit 10a determines that the membrane clogging is mitigated and in a relatively good condition if the differential value ΔTMP is equal to or less than the threshold value Th(b) (0.05 kPa in the present embodiment), determines that the membrane clogging is progressing and it is necessary to accelerate the cleaning operation by the diffusion air if the differential value ΔTMP is equal to or greater than the threshold value Th(a) (0.2 kPa in the present embodiment), and determines that the membrane clogging is not severe and the current air diffusion condition can be maintained if the differential value ΔTMP is between the threshold values Th(b) and Th(a).

Figure 4A:
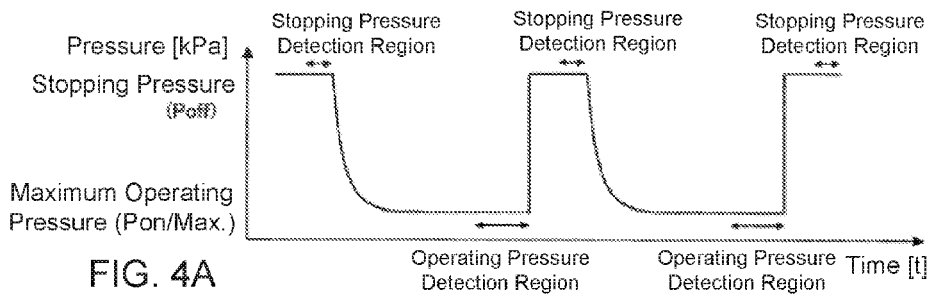
FIG. 4A is a diagram explaining an update process for the reference transmembrane pressure difference.
Figure 4B:
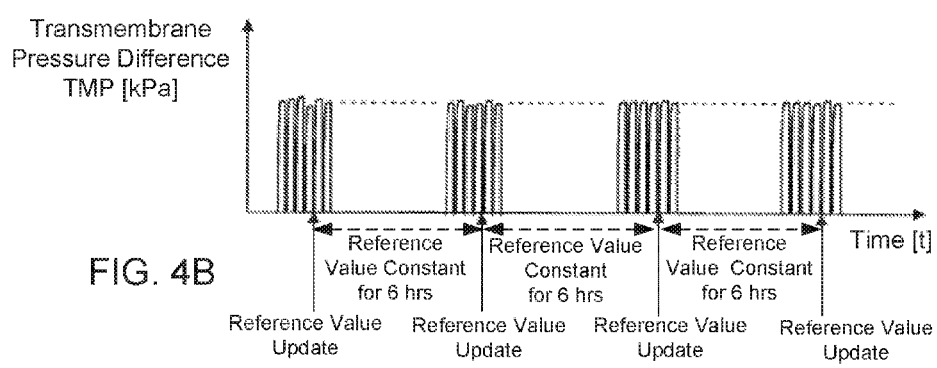
FIG. 4B is a diagram further explaining the update process for the reference transmembrane pressure difference.

As shown in FIG. 4B, the calculating unit 10a updates the reference transmembrane pressure difference TMP (ref. value) at a predetermined time interval which is at least 3 hours but does not exceed 12 hours since the last update of the reference transmembrane pressure difference TMP (ref. value). The time interval for update can be any suitable time period based on the properties of the water to be treated. For example, if the water to be treated is sewage water, the update can be performed at every 3 hours during the daytime in which the water to be treated fluctuates largely, and at every six hours during the nighttime in which the water to be treated less fluctuates. The reference transmembrane pressure difference is updated at a 6-hour interval in the present embodiment.

Figure 9:
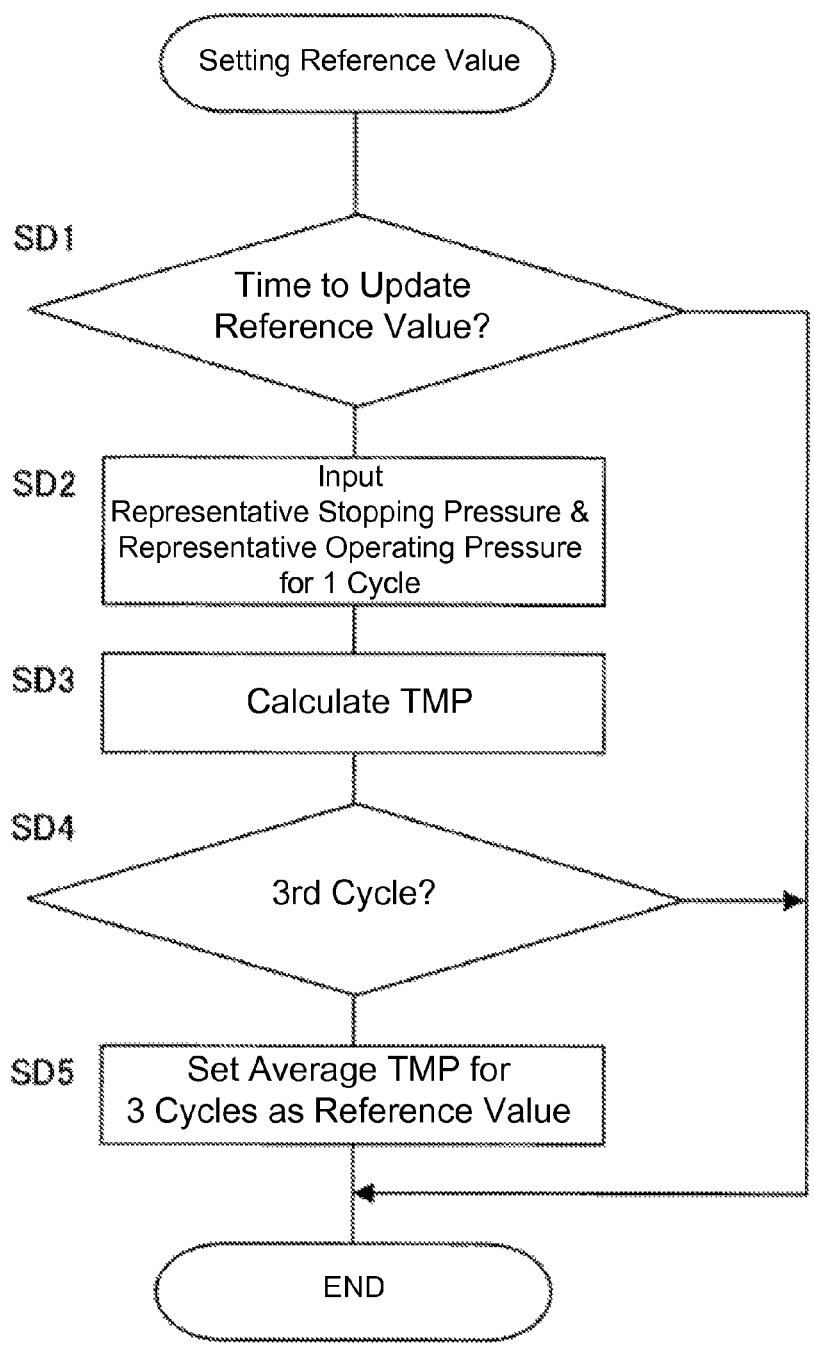
FIG. 9 is a flow diagram showing a process for setting the reference value of the transmembrane pressure difference.

More specifically, as shown in the timing charts in FIGS. 4A and 4B and the flow diagram of FIG. 9, every time when the 6 hours has elapsed (SD1), the calculating unit 10a determines a representative operating pressure using an operation pressure detection region which is set as a predetermined time period toward the end of the operating period Tfon of the filtration pump 8 (for example, a time period since 6 minutes has passed until 9 minutes) (SD2), determines a representative stopping pressure using a stopping pressure detection region which is set as a predetermined time period toward the end of a stopping period Tfoff of the filtration pump 8 (for example, a time period since 40 seconds has passed until 60 seconds) (SD2), successively performs a couple of cycles of calculating the transmembrane pressure difference from those determined values (SD3, SD4), and sets an average of the calculated values as a new updated reference transmembrane pressure difference TMP (ref. value) (SD5).

In the present embodiment, an operating pressure at 8 minutes and 50 seconds from the beginning of the operation period Tfon is determined as the representative operating pressure, a stopping pressure at 59 seconds after the beginning the stopping period Tfoff is determined as the representative stopping pressure, and an average of transmembrane pressure differences obtained from 3 consecutive cycles is set as the updated reference transmembrane pressure difference TMP (ref. Value).

These conditions are illustrated as an example, and can be set in any suitable manner. For example, the representative operating pressure may be determined as an average of operating pressures taken at a predetermined time period within the operating pressure detection region, the representative stopping pressure may be determined as an average of stopping pressures taken at a predetermined time period within the stopping pressure detection region, and the number of cycles for determining the average of the transmembrane pressure differences may be increased.

Figure 4C:
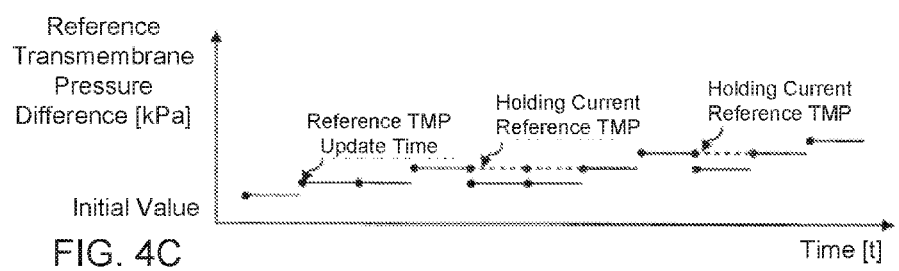
FIG. 4C is a diagram explaining the relationship between changes in the transmembrane pressure difference in the separation membrane and the reference transmembrane pressure difference.

As shown in FIG. 4C, the reference transmembrane pressure difference TMP (ref. value) calculated during the predetermined time interval is set as a new reference transmembrane pressure difference as indicated by a solid line. However, when the calculated reference transmembrane pressure difference TMP (ref. value) is lower than the previous value, it is preferable to maintain the current value without updating, as indicated by a broken line, in order to control the amount of the diffusion air on a safe side so as not to cause an excessive increase in the amount of the diffusion air.

Figure 4D:
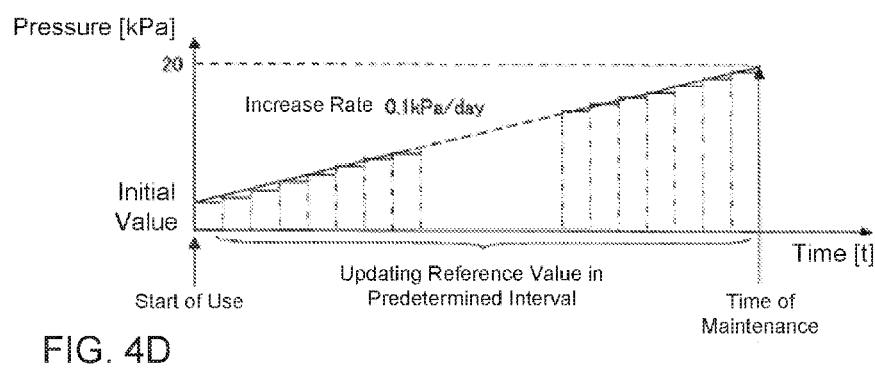
FIG. 4D is a diagram further explaining the relationship between the changes in the transmembrane pressure difference in the separation membrane and the reference transmembrane pressure difference.

As shown in FIG. 4D, in the membrane separation device in accordance with the present embodiment, the operation pressure increases about 0.1 kPa per day, as indicated by a solid line having an upward slope toward the right, when the filtration pump 8 is continuously operated with a sufficient amount of the diffusion air of 7 L/(min.·sheet), although it depends on the water to be treated and filtering operation conditions, thereby demonstrating that the membrane separation device has such a filtration performance that a cleaning maintenance may be performed once every half year.

A step-like characteristic indicated by broken lines in FIG. 4D shows an example of the reference transmembrane pressure difference TMP (ref. value) calculated for the separation membrane 60b every 6 hours. Thus, the reference transmembrane pressure difference TMP (ref. value) has a value substantially tracking the transmembrane pressure difference of the separation membrane 60b which varies as time passes. By controlling the amount of the diffusion air by determining whether the current transmembrane pressure difference is lower or higher than such a reference transmembrane pressure difference, the filtration function is maintained without performing excessive air diffusion.

Controlling of the amount of the diffusion air is described below in detail.

Figure 7:
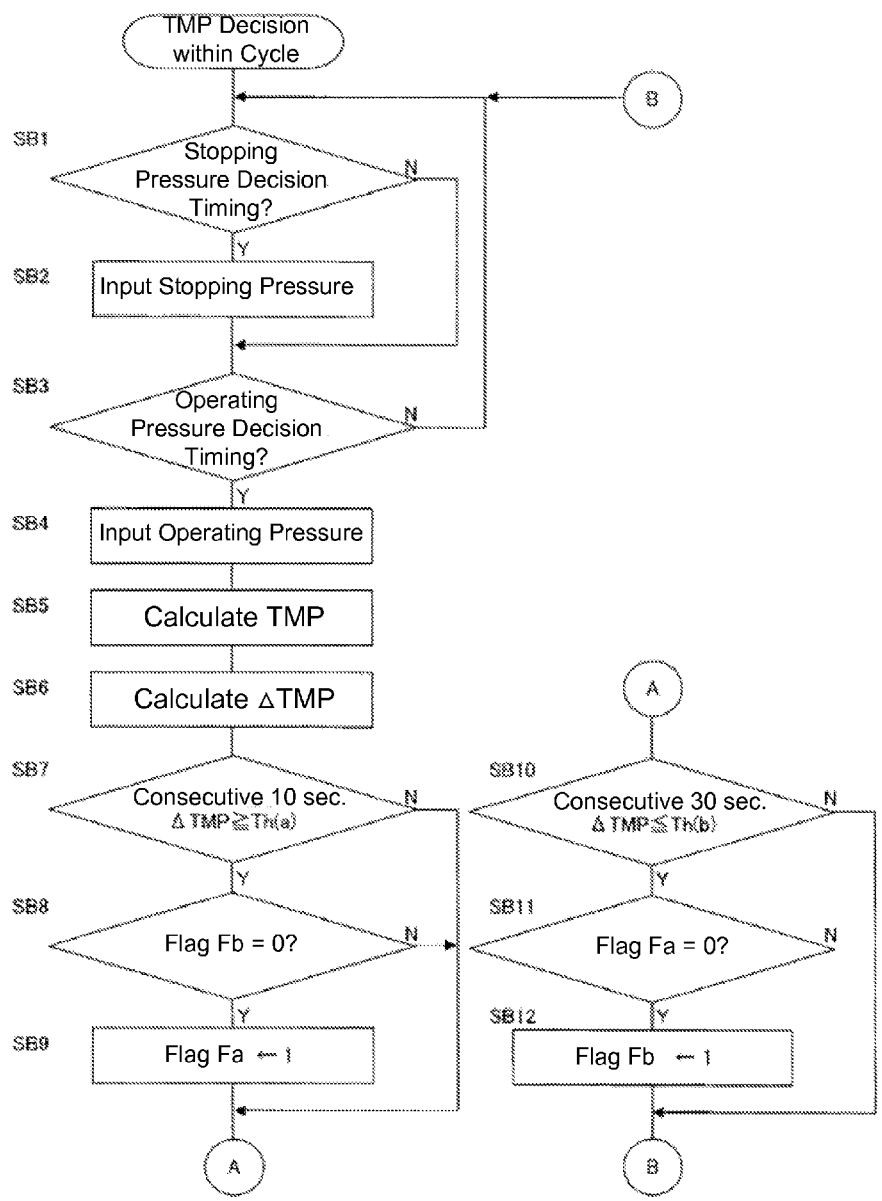
FIG. 7 is a flow diagram showing a process for evaluating the transmembrane pressure difference within a cycle.

FIG. 7 shows a comparison process performed in the calculating unit 10a for every cycle of the filtration pump 8 that is intermittently driven, in which the differential value with respect to the reference transmembrane pressure difference is compared with the threshold.

When a stopping pressure detection timing comes (SB1), a value of the stopping pressure is inputted (SB2), and when an operating pressure detection timing comes (SB3), a value of the operating pressure is inputted (SB4). Then, a transmembrane pressure difference TMP is calculated (SB5), and a differential value $\Delta$TMP of the transmembrane pressure difference TMP with respect to the reference transmembrane pressure difference is calculated (SB6).

The stopping pressure detection timing is an interval corresponding to the stopping pressure detection region in FIG. 4A, and the operating pressure detection timing is an interval corresponding the operating pressure detection region in FIG. 4A and also corresponding to the effective determination period in FIGS. 3C and 3D.

In the operating pressure detection timing, if the differential value $\Delta$TMP equal to or greater than the threshold value Th(a) continues for 10 seconds (SB7), a flag Fa is set (SB9) under the condition that the flag Fb has not been set, and if the differential value $\Delta$TMP equal to or smaller than the threshold value Th(b) continues for 30 seconds (SB10), the flag Fb is set under the condition that the flag Fa has not been set (SB12).

In other words, if no flags are set at the end, the differential value $\Delta$TMP is between the threshold values Th(a) and Th(b). In the present example, both flags are not set at the same time such that a flag set first is made effective during one cycle of the filtration pump 8. However, it is also possible to reset one flag upon setting the other such that a flag set last is made effective.

Figure 8:
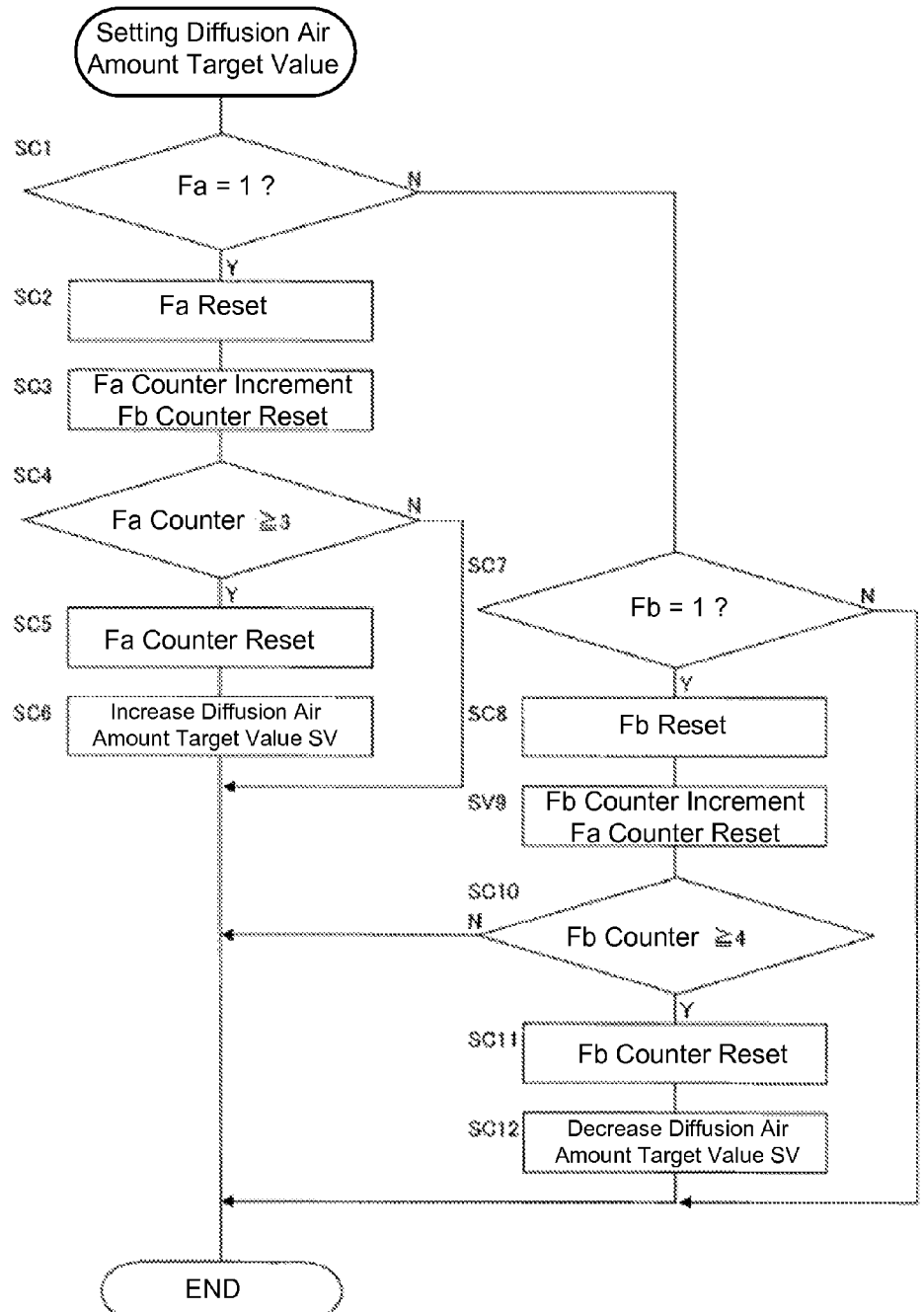
FIG. 8 is a flow diagram showing a process for setting the target value of the amount of the diffusion air.

FIG. 8 shows a process for setting the target value for the amount of the diffusion air based on the differential value $\Delta$TMP, which is performed in the calculating unit 10a. This process is performed after completing the comparison process for the differential value $\Delta$TMP with respect to the threshold value shown in FIG. 7, and determines whether to increase or decrease the amount of the diffusion air based on the tendency of the differential value $\Delta$TMP during a plurality of cycles of the intermittent operation of the filtration pump 8.

If the flag Fa has been set (SC1), the flag Fa is reset (SC2) for the next comparison process shown in FIG. 7, a counter corresponding to the flag Fa is incremented by +1, and a counter corresponding to the flag Fb is reset (SC3).

Each counter is used to determine if the corresponding flag is successively set for a plurality of cycles as a result of the comparison process of FIG. 7. The process in step SC3 resets the counter corresponding to the flag Fb while the counter corresponding to the flag Fa is continuously counting to a predetermined number.

If the counter corresponding to the flag Fa counts the predetermined number which is 3 in the present embodiment (SC4), the counter is reset (SC5), and the amount of the diffusion air target value SV is set to increase (SC6).

If the flag Fa is not set at the step SC1, the state of the flag Fb is determined (SC7), and if the flag Fb has been set, the flag Fb is reset (SC8) for the next comparison process described in FIG. 7, the counter corresponding to the flag Fb is incremented by +1, and the counter corresponding to the flag Fa is reset (SC9).

The process in step SC9 resets the counter corresponding to the flag Fa when the counter corresponding to the flag Fb continuously is counting a predetermined number.

If the counter corresponding to the flag Fb counts to the predetermined number which is 4 in the present embodiment (SC10), the counter is reset (SC11), and the diffusion air target value SV is reduced (SC12). Although in this example, the maximum value of the counter corresponding the flag Fa is 3, and that of the counter corresponding the flag Fb is 4, they are not limited to these values so long as the maximum value for the counter corresponding to the flag Fb is larger than the maximum value for the counter corresponding to the flag Fa.

Figure 5:
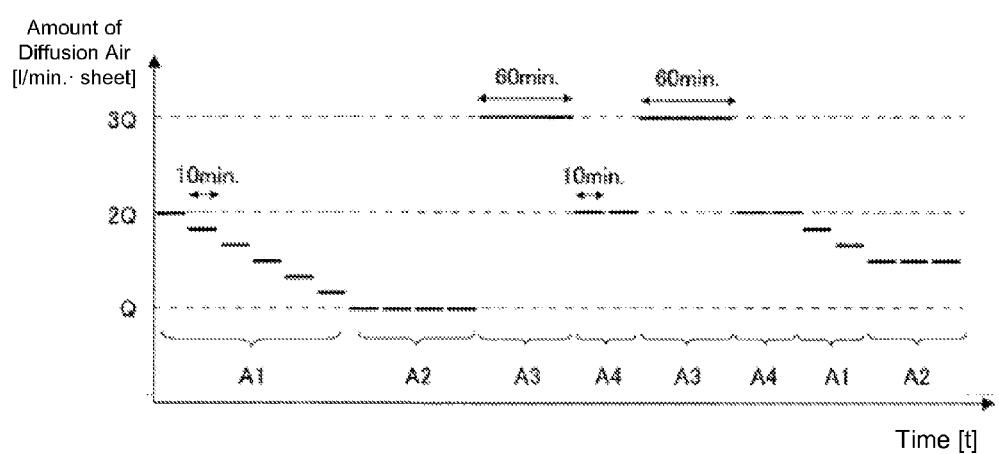
FIG. 5 is a diagram illustrating changes in the amount of the diffusion air.

FIG. 5 shows transitions of the amount of the diffusion air that is set in the steps SC6 and SC12. The amount of the diffusion air which is set to 2Q (=7l/(min. sheets)) as the initial state, updated so as to gradually decrease by a small value of Q/3 in a region A1 every time the counter corresponding to the flag Fb counts 4, that is, every time the differential value ΔTMP equal to or smaller than the minimum threshold value Th(b) is maintained for 4 cycles.

As shown in a region A2, a minimum diffusion air amount is fixed to Q after the above-mentioned situation continues. In a region A3, if the counter corresponding to the flag Fa counts 3, in other words, every time the differential value ΔTMP equal to or greater than the maximum threshold value Th(a) is maintained for 3 cycles, the amount of the diffusion air is suddenly increased to a maximum diffusion air amount 3Q which continues for 60 minutes.

After the 60 minutes has passed, the amount of the diffusion air is reduced to 2Q in a region A4, and then the process for setting the target value of the amount of the diffusion air described in FIG. 8 is performed. In the region 4A, the process for setting the target value of the amount of the diffusion air may also be performed with the maximum diffusion air amount 3Q without reducing the amount of the diffusion air to 2Q. The maximum diffusion air amount 3Q is just an example, and is not limited to this value. Furthermore, it is not limited to an embodiment to increasing the amount of the diffusion air to the maximum diffusion air amount 3Q at once, but it can be increased over a couple of cycles via a plurality of steps to set to the maximum diffusion air amount 3Q.

In other words, an absolute value of a difference or a rate of the difference of the target value SV for increasing the amount of the air diffusion is set greater than an absolute value of a difference or a rate of the difference of the target value SV for decreasing the amount of the air diffusion.

By this, when the transmembrane pressure difference is high, the separation membrane is already in a condition where solid materials and the like are attached to the separation membrane surface. Thus, in order to release such a condition quickly and reliably, the amount of the diffusion air is increased by a larger rate of change than that for reducing the amount of the diffusion air, so as to enhance the cleaning effect of the separation membrane with an upward current of air bubbles and the water to be treated whereby the materials on the separation membrane surface can be effectively removed.

When the transmembrane pressure difference is low, in order to reduce a risk of clogging of the separation membrane surface when the amount of the diffusion air is reduced, and to perform a careful determination for such a reduction, the amount of the diffusion air is reduced by a smaller rate of change than that for increasing the amount of the diffusion air to suppress a sudden change of the upward current of the air bubbles and the water to be treated, thereby avoiding a sudden reduction of the removing effect for the deposits and the like on the separation membrane surface, as well as suppressing new deposits of solid materials.

Furthermore, when the amount of the diffusion air is to increase, the target value is held unchanged for at least 1 hour regardless of the subsequent differential value ΔTMP. A holding time may be any suitable time period between 30 minutes to 3 hours. In other words, regardless of the differential value ΔTMP, the holding time for the target value SV set to increase the amount of the diffusion air is set longer than the holding time for the target value SV set to decrease the amount of the diffusion air.

The target value SV for the amount of the diffusion air set by the calculating unit 10a is output to the PID control unit 10b. The PID control unit 10b performs a PID calculation based on the deviation between the amount of air PV sent from the air flow sensor Fm and the target value SV, and the like, and provides the inverter circuit 10c with a controlling value MV necessary to bring the amount of air PV to the target value SV. The inverter circuit 10 controls the frequency of a motor which is a power source of the blower B, thereby controlling the amount of the diffusion air.

Accordingly, the membrane separation device 6 of the present invention includes the calculating unit 10a as the target value setting section which sets the target value of the amount of the diffusion air diffused from the air diffusion device 7 based on the transmembrane pressure difference, and the PID control unit 10b as the amount of the diffusion air controlling section which controls the air diffusion device 7 so that the amount of the diffusion air becomes the target value. The target value setting section is configured to set an absolute value of a change or a rate of change in the target value for increasing the amount of the diffusion air greater than an absolute value of a change or a rate of change in the target value for decreasing the amount of the diffusion air.

Furthermore, the calculating unit 10a also operates as the reference transmembrane pressure difference setting section which updates, in every predetermined period of time, the reference transmembrane pressure difference for evaluating the measured transmembrane pressure difference, and as the target value setting section which sets the target value of the amount of the diffusion air diffused from the air diffusion device 7 based on the differential value between the reference transmembrane pressure difference and the measured transmembrane pressure difference.

Using the control device 10 described above, the method of operating the membrane separation device according to the present invention is realized. The method of operating the membrane separation device includes a target value setting step which sets the target value SV of the amount of the diffusion air diffused from the air diffusion device 7 based on the transmembrane pressure difference, and a diffusion air amount controlling step which controls the air diffusion device 7 so that the amount of the diffusion air becomes the target value SV. In the target value setting step, an absolute value of a change or a rate of change in the target value for increasing the amount of the diffusion air is set greater than an absolute value of a change or a rage of change in the target value for decreasing the amount of the diffusion air.

Furthermore, in the diffusion air amount controlling step, the holding time of the target value SV set to increase the amount of the diffusion air is longer than the holding time for the target value SV set to decrease the amount of the diffusion, regardless of the transmembrane pressure difference.

In the target value setting step, a duration time (for example, 30 seconds in the present embodiment, although it is not a fixed value) for the transmembrane pressure difference smaller than the threshold value Th(b) for decreasing the target value is set longer than a duration time (for example, 10 seconds in the present embodiment, although it is not a fixed value) for the transmembrane pressure difference greater than the threshold value Th(a) for increasing the target value. The target value is modified when the above-mentioned relationship between the transmembrane pressure difference and the respective threshold value is maintained for a time period exceeding the corresponding duration time.

Furthermore, in the method for operating the membrane separation device described above, it is preferable for the target value setting step to set the target value of the amount of the diffusion air diffused from the air diffusion device 7 based on the differential value between the reference transmembrane pressure difference and the measured transmembrane pressure difference, and it is also preferable to perform a reference transmembrane pressure difference setting step that updates, in every predetermined period of time, the reference transmembrane pressure difference for evaluating the measured value of the transmembrane pressure difference.

Similarly, in the target value setting step, two threshold values are set for the differential value ΔTMP between the reference transmembrane pressure difference TMP (ref. value) and the measured transmembrane pressure difference TMP (cur. value). The target value is increased if the differential value is equal to or greater than the first threshold value Th(a), while the target value is decreased if the differential value is equal to or smaller than the second threshold value Th(b) which is smaller than the first threshold value Th(a), and the target value is maintained if the differential value is between the first threshold value and the second threshold value.

Furthermore, in the reference transmembrane pressure difference setting step, if the currently-updated reference transmembrane pressure difference TMP (ref. value) is smaller than the last-updated reference transmembrane pressure difference, the last-updated reference transmembrane pressure difference is maintained and utilized as the reference transmembrane pressure difference.

In the reference transmembrane pressure difference setting step, the reference transmembrane pressure difference is updated when at least 3 hours but no more than 12 hours has passed.

Figure 10A:
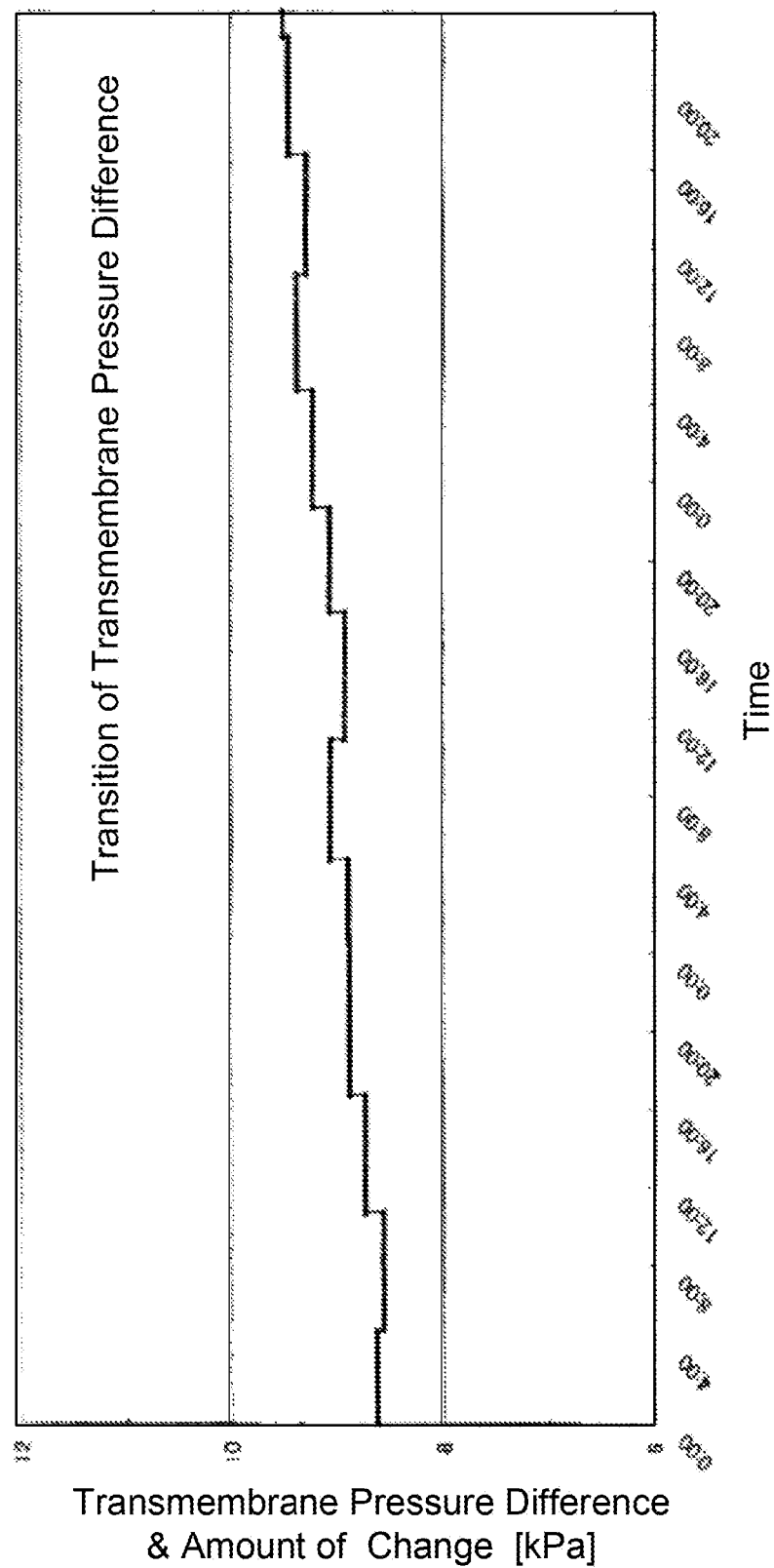
FIG. 10A is a diagram showing a transition of the reference transmembrane pressure difference.

FIG. 10A shows experimental data illustrating transitions of the reference transmembrane pressure difference over a 3-day period in the membrane separation device 6 which is controlled by the control device 10. The experimental data employed here is not intended to show suppression of the amount of the diffusion air at a low level, but to well-illustrate changes in the amount of the diffusion air corresponds to FIG. 4C, which is characteristic to the present invention. It should be noted that the maximum value of the amount of the diffusion air in the experimental data is a typical value of the conventional constant flow rate air diffusion. The reference transmembrane pressure difference is updated at an interval of about 6 hours.

Figure 10B:
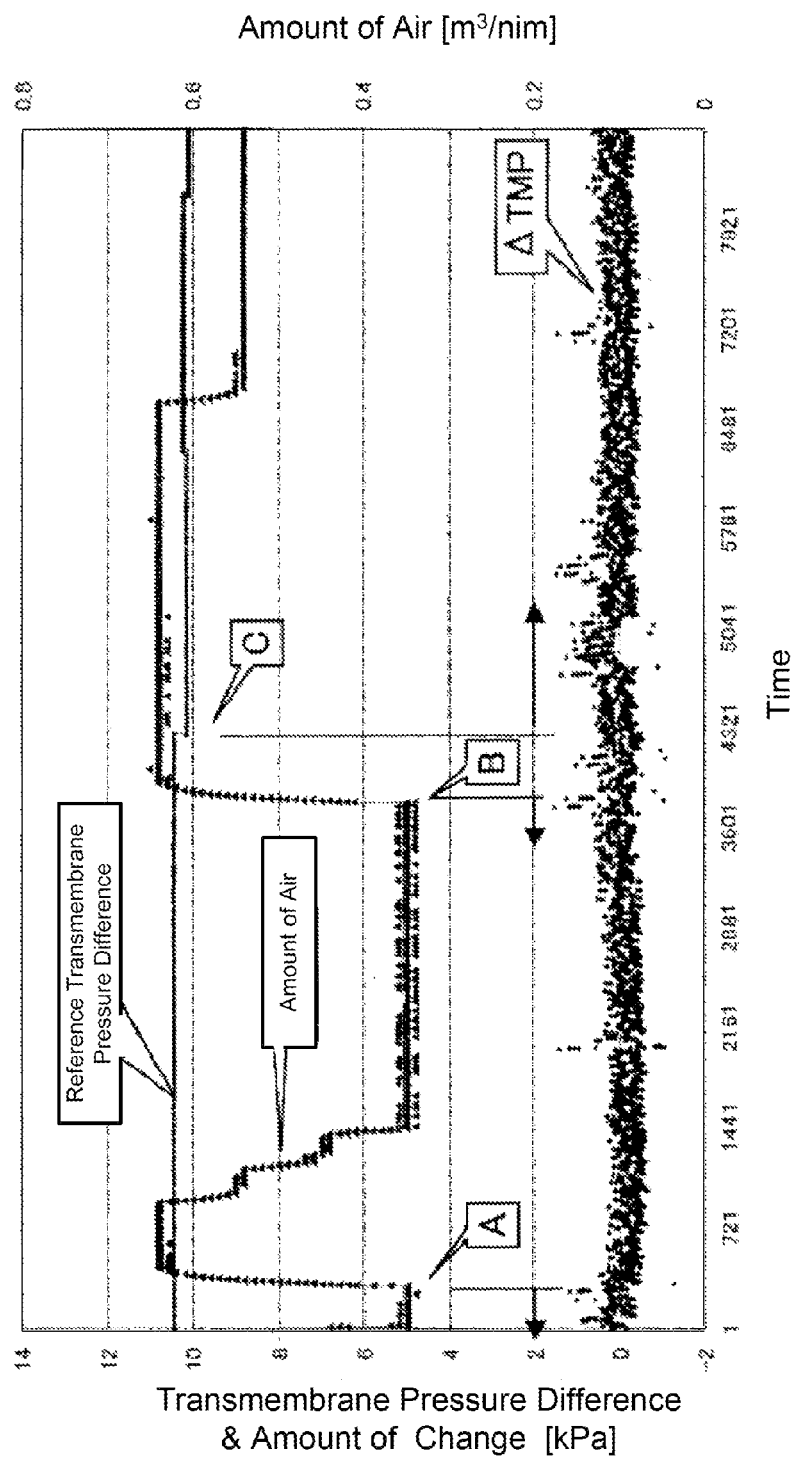
FIG. 10B is a diagram showing a transition of the amount of air with respect to the reference transmembrane pressure difference and ΔTMP.

The FIG. 10B shows respective transitions of the amount of the diffusion air diffused from the air diffusion device 7, the differential value ΔTMP of the transmembrane pressure difference TMP with respect to the reference transmembrane pressure difference, on which the amount of air is based, and the reference transmembrane pressure difference of the same membrane separation device 6.

It can be recognized that the amount of the diffusion air is greatly increased in a step-like manner at two timings A and B. As is indicated by large values of the differential value ΔTMP immediately prior to the great increases, it is determined that the clogging of the separation membrane has worsened. After that, the differential value ΔTMP is maintained substantially at a low level around 0, and the amount of the diffusion air is reduced in a stepwise manner.

In this experiment, after the amount of the diffusion air is increased at timing B, the reference transmembrane pressure difference is updated at timing C to a value lower than the previous value immediately prior thereto. As is recognized from the fact that the differential value ΔTMP has larger values for a certain period of time since then, it is preferable to maintain the current target value without updating when the reference transmembrane pressure difference is reduced from the previous value.

The first threshold value Th(a) and the second threshold value Th(b) described above are illustrative examples, and are not limited to the specific values and can be set to any suitable values. Furthermore, a single threshold value can be used such that the target value of the amount of the diffusion air is increased when the differential value ΔTMP is greater than the threshold value, and is decreased when the differential value ΔTMP is smaller than the threshold value.

The membrane separation activated sludge treatment device described in the above embodiment is formed of two tanks of an anaerobic tank and a membrane separation tank. However, it may be formed of three tanks of an anaerobic tank, an aeration tank, and a membrane separation tank, though the anaerobic tank is not a necessary element. In addition, the activated sludge treatment device may employ a membrane separation activated sludge method using an initial sedimentation site, an aeration tank, and a membrane separation tank.

The above-described embodiment is one aspect of the present invention, and the present invention is not limited thereto, and each part of the specific construction or the controlling examples can be modified so long as the functions and effects of the present invention are achieved.

What is claimed is:

1. A method for operating a membrane separation device, the membrane separation device including a separation membrane immersed in water to be treated and an air diffusion device positioned below the separation membrane, the membrane separation device providing treated water that has permeated through the separation membrane while diffusing air from the air diffusion device towards the separation membrane, the method comprising:

setting and updating a target value of an amount of the diffusion air diffused from the air diffusion device based on a transmembrane pressure difference of the separation membrane; and diffusing air from the air diffusion device towards the separation membrane by controlling the amount of the diffusion air to become the target value by increasing or decreasing the amount of the diffusion air, wherein the setting and updating the target value includes:
updating the target value such that a change or a rate of change in the target value has a first predetermined absolute value when the amount of the diffusion air is being increased based on the transmembrane pressure difference indicating that materials are attached to the separation membrane; and updating the target value such that the change or the rate of change in the target value has a second predetermined absolute value when the amount of the diffusion air is being decreased based on the transmembrane pressure difference not indicating that materials are attached to the separation membrane, the first predetermined absolute value being greater than the second predetermined absolute value such that the amount of the diffusion air is increased at a first rate greater than a second rate at which the amount of the diffusion air is decreased, thereby enhancing a cleaning effect when the materials are attached to the separation membrane and the amount of the diffusion air is being increased while reducing a risk of clogging of the separation membrane due to a sudden reduction of the amount of the diffusion air when the amount of the diffusion air is being reduced.

2. The method for operating the membrane separation device according to claim 1, wherein in the setting and updating the target value further includes:
setting a first holding time for the target value when the amount of the diffusion air is being increased; and
setting a second holding time for the target value when the amount of the diffusion air is being decreased, the first holding time being greater than the second holding time regardless of the transmembrane pressure difference, thereby further improving the cleaning effect when the materials are attached to the separation membrane while achieving quick reduction of the diffusion air when the diffusion air is being reduced.

3. The method for operating the membrane separation device according to claim 2, wherein the setting and updating the target value further includes:
setting a first duration time for the transmembrane pressure difference when the transmembrane pressure difference is smaller than a first threshold value for reducing the target value; and
setting a second duration time for the transmembrane pressure difference when the transmembrane pressure difference is greater than a second threshold value for increasing the target value, the first duration time being set longer than the second duration time,
and wherein the target value is modified when the transmembrane pressure difference smaller than the first threshold value is maintained longer than the first duration time, or the transmembrane pressure difference greater than the second threshold value is maintained longer than the second duration time.

4. The method for operating the membrane separation device according to claim 1, wherein the setting and updating the target value further includes:
setting a first duration time for the transmembrane pressure difference when the transmembrane pressure difference is smaller than a first threshold value for reducing the target value, and
setting a second duration time for the transmembrane pressure difference when the transmembrane pressure difference is greater than a second threshold value for increasing the target value, the first duration time being set longer than the second duration time,
and wherein the target value is modified when the transmembrane pressure difference smaller than the first threshold value is maintained longer than the first duration time, or the transmembrane pressure difference greater than the second threshold value is maintained longer than the second duration time.

5. The method for operating the membrane separation device according to claim 1, further comprising:
setting and updating a reference transmembrane pressure for evaluating a measured transmembrane pressure difference in every predetermined period of time,
wherein the transmembrane pressure difference is the measured transmembrane pressure difference, and the target value is set based on a differential value between the reference transmembrane pressure difference and the measured transmembrane pressure difference,
and wherein the setting and updating the target value further includes:
setting a first threshold value and a second threshold value for the differential value between the reference transmembrane pressure difference and the measured transmembrane pressure difference;
increasing the target value when the differential value is equal to or greater than the first threshold value;
decreasing the target value when the differential value is equal to or smaller than the second threshold value which is smaller than the first threshold value; and
maintaining the target value when the differential value is between the first threshold value and the second threshold value, thereby avoiding frequent changes in a flow on a surface of the separation membrane to achieve stable filtration.

6. The method for operating the membrane separation device according to claim 5, wherein the setting the reference transmembrane pressure difference includes:
maintaining a last-updated reference transmembrane pressure difference as the reference transmembrane pressure difference if a currently-updated reference transmembrane pressure difference is smaller than the last-updated reference transmembrane pressure difference.

7. The method for operating the membrane separation device according to claim 5, wherein the setting the reference transmembrane pressure difference includes:
updating the reference transmembrane pressure difference after at least 3 hours but no more than 12 hours has passed.

8. A membrane separation device comprising:
a separation membrane immersed in water to be treated, the water permeating through the separation membrane;
an air diffusion device positioned below the separation membrane, the air diffusion device diffusing air towards the separation membrane; and
a control device for controlling the air diffusion device to increase or decrease an amount of the diffusion air depending on a transmembrane pressure difference of the separation membrane, the control device including:
a target value setting section that sets and updates a target value of the amount of the diffusion air based on the transmembrane pressure difference; and
a diffusion air amount controlling section that controls the air diffusion device so that the amount of the diffusion air becomes the target value,
wherein the target value setting section updates the target value such that a change or a rate of change in the target value has a first predetermined absolute value when the amount of the diffusion air is being increased based on the transmembrane pressure difference indicating that materials are attached to the separation membrane, and that the change or the rate of change in the target value has a second predetermined absolute value smaller than the first predetermined absolute value when the amount of the diffusion air is being decreased based on the transmembrane pressure difference not indicating that materials are attached to the separation membrane, whereby the air diffusion device increases the amount of the diffusion air at a first rate greater than a second rate at which the amount of the diffused air is decreased, such that a cleaning effect is enhanced when the materials are attached to the separation membrane and the amount of the diffusion air is being increased while a risk of clogging of the separation membrane due to a sudden reduction of the amount of the diffusion air is reduced when the amount of the diffusion air is being reduced.

9. The membrane separation device according to claim 8, wherein the transmembrane pressure difference is a measured transmembrane pressure difference,
wherein the control device further includes:
- a reference transmembrane pressure difference setting section that updates, in every predetermined period of time, a reference transmembrane pressure difference for evaluating the measured transmembrane pressure difference, and wherein the target value setting section sets the target value based on a differential value between the reference transmembrane pressure difference and the measured transmembrane pressure difference, by setting a first threshold value and a second threshold value for the differential value between the reference transmembrane pressure difference and the measured transmembrane pressure difference, increasing the target value when the differential value is equal to or greater than the first threshold value, decreasing the target value when the differential value is equal to or smaller than the second threshold value which is smaller than the first threshold value, and maintaining the target value when the differential value is between the first threshold value and the second threshold value, thereby avoiding frequent changes in a flow on a surface of the separation membrane to achieve stable filtration.

* * * * *